(12) United States Patent
Wiesman et al.

(10) Patent No.: US 7,158,012 B2
(45) Date of Patent: **\*Jan. 2, 2007**

(54) NON-INVASIVE POWERLINE COMMUNICATIONS SYSTEM

(75) Inventors: Richard M. Wiesman, Wayland, MA (US); Timothy J. Mason, Uxbridge, MA (US); Gary R. Bastarache, Athol, MA (US)

(73) Assignee: Foster-Miller, Inc., Waltham, MA (US)

( \* ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 43 days.

This patent is subject to a terminal disclaimer.

(21) Appl. No.: 08/741,597

(22) Filed: Nov. 1, 1996

(65) Prior Publication Data

US 2001/0052843 A1 Dec. 20, 2001

(51) Int. Cl.
*H04M 11/04* (2006.01)

(52) U.S. Cl. ............................ 340/310.01; 340/310.07; 324/126; 324/127; 361/93

(58) Field of Classification Search ............ 340/310.01, 340/310.02, 310.07, 310.03; 324/126, 127, 324/544; 361/93; 307/104
See application file for complete search history.

(56) References Cited

U.S. PATENT DOCUMENTS

| 2,241,837 | A | | 5/1941 | Williams et al. ............ 188/379 |
|---|---|---|---|---|
| 3,142,015 | A | | 7/1964 | Kusters et al. .............. 324/679 |
| 3,312,895 | A | | 4/1967 | Garbuny ...................... 324/96 |
| 3,428,896 | A | | 2/1969 | Schweitzer, Jr. ............ 324/126 |
| 3,504,283 | A | | 3/1970 | Meservey .................... 324/127 |
| 4,002,976 | A | | 1/1977 | Zulaski ....................... 324/126 |
| 4,009,477 | A | | 2/1977 | Rozylowicz ................ 324/156 |
| 4,142,178 | A | \* | 2/1979 | Whyte et al. .......... 340/310.01 |
| 4,204,194 | A | | 5/1980 | Bogacki ................ 340/870.02 |
| 4,210,744 | A | | 7/1980 | Bateman ..................... 528/363 |
| 4,210,901 | A | | 7/1980 | Whyte et al. .......... 340/310.06 |
| 4,268,818 | A | | 5/1981 | Davis et al. ........... 340/870.38 |

(Continued)

FOREIGN PATENT DOCUMENTS

| DE | 1566 60 | 9/1982 |
|---|---|---|
| EP | 0 342 597 B1 | 12/1994 |
| JP | 58007937 | 1/1983 |

*Primary Examiner*—Davetta W. Goins
(74) *Attorney, Agent, or Firm*—Iandiorio & Teska (57) ABSTRACT

A non-invasive powerline communications system includes: means for generating communication signals at a first location for transmission on a powerline; means for reactively coupling the communication signals to the powerline; and means for receiving said communication signals at a second location.

30 Claims, 4 Drawing Sheets

U.S. PATENT DOCUMENTS

| | | | |
|---|---|---|---|
| 4,348,638 A | | 9/1982 | Boldridge, Jr. .............. 324/127 |
| 4,350,980 A | * | 9/1982 | Ward ..................... 340/870.02 |
| 4,383,243 A | * | 5/1983 | Kriigel et al. .......... 340/310.02 |
| 4,384,289 A | | 5/1983 | Stillwell et al. ........ 340/870.17 |
| 4,420,752 A | | 12/1983 | Davis et al. ........... 340/870.17 |
| 4,535,447 A | | 8/1985 | Rosanes et al. ............. 370/537 |
| 4,578,639 A | | 3/1986 | Miller .......................... 324/96 |
| 4,611,207 A | | 9/1986 | Anderson et al. ...... 340/870.16 |
| 4,622,535 A | | 11/1986 | Ise et al. ............... 340/310.05 |
| 4,629,979 A | | 12/1986 | Missout et al. ............. 324/126 |
| 4,668,934 A | | 5/1987 | Shuey ........................ 340/310 |
| 4,709,339 A | | 11/1987 | Fernandes ................... 324/127 |
| 4,714,893 A | | 12/1987 | Smith-Vaniz ............... 324/126 |
| 4,724,381 A | | 2/1988 | Crimmins ................... 324/127 |
| 4,758,962 A | | 7/1988 | Fernandes ................... 364/483 |
| 4,777,381 A | | 10/1988 | Fernandes .................... 307/64 |
| 4,786,862 A | | 11/1988 | Sieron ........................ 324/126 |
| 4,791,361 A | | 12/1988 | Beihoff et al. .............. 324/126 |
| 4,794,327 A | | 12/1988 | Fernandes ................... 324/126 |
| 4,794,328 A | | 12/1988 | Fernandes et al. .......... 324/127 |
| 4,794,329 A | | 12/1988 | Schweitzer, Jr. ............ 324/127 |
| 4,795,973 A | | 1/1989 | Smith-Vaniz et al. ....... 324/126 |
| 4,799,005 A | | 1/1989 | Fernandes ................... 324/127 |
| 4,801,937 A | | 1/1989 | Fernandes ............. 340/870.16 |
| 4,808,916 A | | 2/1989 | Smith-Vaniz ............... 324/110 |
| 4,808,917 A | | 2/1989 | Fernandes et al. .......... 324/127 |
| 4,823,022 A | | 4/1989 | Lindsey ...................... 307/149 |
| 4,827,272 A | | 5/1989 | Davis ......................... 343/702 |
| 4,829,298 A | | 5/1989 | Fernandes ............. 340/870.27 |
| 4,831,327 A | | 5/1989 | Chenier et al. ............. 324/127 |
| 4,847,780 A | | 7/1989 | Gilker et al. ............... 364/483 |
| 4,855,671 A | | 8/1989 | Fernandes ................... 324/127 |
| 4,862,088 A | | 8/1989 | Etienne et al. .............. 324/326 |
| 4,904,996 A | | 2/1990 | Fernandes ............. 340/870.07 |
| 4,935,693 A | | 6/1990 | Falkowski et al. .......... 324/127 |
| 4,961,049 A | | 10/1990 | Ghislanzoni ................ 324/117 |
| 4,999,571 A | | 3/1991 | Ishiko et al. .................. 324/96 |
| 5,006,846 A | | 4/1991 | Granville et al. ...... 340/870.28 |
| 5,015,944 A | | 5/1991 | Bubash ....................... 324/127 |
| 5,017,859 A | | 5/1991 | Engel et al. ................. 324/106 |
| 5,051,733 A | | 9/1991 | Neuhouser .................. 340/660 |
| 5,065,124 A | | 11/1991 | Chrzan ....................... 333/246 |
| 5,124,642 A | | 6/1992 | Marx ........................ 324/127 |
| 5,140,257 A | | 8/1992 | Davis ........................ 324/106 |
| 5,210,519 A | | 5/1993 | Moore ................... 340/310.06 |
| 5,220,495 A | | 6/1993 | Zulaski ........................ 363/84 |
| 5,303,112 A | | 4/1994 | Zulaski et al. ............... 361/67 |
| 5,397,982 A | | 3/1995 | Van Lankvelt |
| 5,426,360 A | | 6/1995 | Maraio et al. .............. 324/126 |
| 5,473,244 A | | 12/1995 | Libove et al. ............. 324/126 |
| 5,477,091 A | * | 12/1995 | Fiorina et al. ................ 307/66 |
| 5,550,476 A | | 8/1996 | Lau et al. .................... 324/326 |
| 5,559,377 A | * | 9/1996 | Abraham .................... 307/104 |
| 5,565,783 A | | 10/1996 | Lau et al. ................... 324/522 |
| 5,656,931 A | | 8/1997 | Lau et al. ................... 324/522 |
| 5,684,450 A | * | 11/1997 | Brown .................. 340/310.02 |
| 5,729,145 A | | 3/1998 | Blades ....................... 324/536 |
| 5,729,888 A | | 3/1998 | Abdelgawad et al. ...... 29/602.1 |
| 5,758,962 A | | 6/1998 | Ismar .......................... 366/97 |
| 5,856,776 A | * | 1/1999 | Armstrong et al. .... 340/310.01 |
| 5,892,430 A | * | 4/1999 | Wiesman et al. ..... 340/310.01 |
| 5,938,151 A | | 8/1999 | Takason et al. ............. 246/194 |
| 6,114,847 A | * | 9/2000 | Johnson ..................... 324/127 |

* cited by examiner

NON-INVASIVE POWERLINE COMMUNICATIONS SYSTEM

FIELD OF INVENTION

This invention relates to a powerline communication system and more particularly to such a system which couples communications signals between a communications device and a powerline in a completely non-invasive manner by reactively coupling the signals to and from the powerline.

RELATED CASE

This invention is a continuation-in-part application of the application entitled "MODULAR CORE, SELF-POWERED POWERLINE SENSOR" by the present inventors filed an even date herewith.

BACKGROUND OF INVENTION

Monitoring conditions in or about a.c. powerlines, in both overhead and underground and primary and secondary applications, is a useful practice for electric utility companies in order to anticipate outages which occur due to faulty equipment and overloads on a.c. powerlines and which result in loss of service for potentially a large number of customers. The potential for an outage and for loss of the greatest number of customers is increased during peak periods when power usage is at a maximum and delivery of continuous power is most critical. Outages caused by faulty and overloaded lines, transformers and other equipment are expensive to repair, dangerous for utility company employees, and costly to the electric utility company in terms of income lost for lost service and in terms of damage to the utility's reputation. The effects of an unexpected outage as a result of a faulty or overloaded powerline are exacerbated if the powerline is underground.

Thus, a.c. powerline sensors which sense electrical conditions, such as power, voltage and current are very useful to electric utility companies in monitoring a.c. powerlines and associated equipment, such as transformers and switches, in order to better anticipate the likelihood of an unexpected outage occurring due to faulty and overloaded equipment. If the electric utility companies are able to monitor the conditions on the powerlines, they are better able to perform maintenance on and replacement of powerlines which are likely to become de-energized as a result of an overload or fault, thereby lowering the number of unexpected outages.

In order to perform this monitoring most efficiently, typically a communications link between each sensor on the system being monitored and a remote base station is established. This allows the utility company to monitor all of its sensors in one remote location instead of having to individually check each sensor in situ. One method of establishing a communications link is achieved by transmitting signals to a local ground station by means of, for example, an FM radio link. The signals are then transmitted to a remote central monitoring location via, e.g. radio, land lines or satellite channels. See U.S. Pat. No. 4,786,862 to Sieron. This type of communication link is complex, expensive and requires use of a significant amount of hardware.

A better approach involves utilizing the powerline being monitored to transmit high frequency communications signals between the sensors and the base station. This is accomplished by making a direct electrical connection between the sensors and the powerline and the base station and the powerline. The direct electrical connection, however, requires that an invasive electrical connection be made to the power circuit that is being monitored. This type of installation is expensive for the utility company as it requires a significant number of man hours to perform the installation, is potentially dangerous for the installer and can cause a service interruption for the customer. Due to these limitations, powerline communications have not been widely used in the electric utility industry for communications with powerline sensors.

SUMMARY OF INVENTION

It is therefore an object of this invention to provide a powerline communications system which non-invasively couples communications signals to and from a powerline.

It is a further object of this invention to provide such a non-invasive powerline communication system which does not require that a direct electrical connection be made to the powerline.

It is a further object of this invention to provide such a non-invasive powerline communication system which is very easily, inexpensively and safely installed on the powerline.

It is a further object of this invention to provide such a non-invasive powerline communication system which may be installed without causing a service interruption to the customer.

It is a further object of this invention to provide such a non-invasive powerline communication system which, because it uses the powerline being monitored to transmit the communication signals, requires less hardware than prior systems which do not perform powerline communications.

This invention results from the realization that a truly simple, safe and inexpensive powerline communications system can be achieved by providing means for generating communication signals at a first location for transmission on a powerline, reactively coupling the generated communications signals to the powerline and receiving the communication signals at a second location.

This invention features a non-invasive powerline communications system. The system includes means for generating communication signals at a first location for transmission on a powerline. There are means for reactively coupling the communication signals to the powerline and means for receiving the communication signals at a second location (e.g., a base station).

In a preferred embodiment, the means for generating may include a first communications device. The means for reactively coupling may include means for inductively coupling the communication signals to the powerline. The means for inductively coupling may include a communications core element disposed about the powerline and a plurality of windings disposed about the communications core element for coupling the communication signals to the powerline.

The means for reactively coupling may include means for capacitively coupling the communication signals to the powerline. The means for capacitively coupling may also include a capacitor having first and second spaced plates located proximate the powerline and a dielectric disposed between the plates for capacitively coupling the communication signals to the powerline. The first and second plates of the capacitor may be coaxially disposed about the powerline.

There may further be included means for reactively (inductively or capacitively) coupling the communication signals from the powerline to the base station. There may further be means for reactively (inductively or capacitively) coupling communications signals generated at the base station back onto the powerline to be sent to the first location. There may also be means for reactively (inductively or capacitively) coupling these base station signals to the first location.

This invention also features a non-invasive powerline communications transmitter, which includes means for generating communication signals for transmission on a powerline and means for reactively coupling the communication signals to the powerline.

This invention further features a non-invasive powerline communications receiver for receiving communication signals transmitted over a powerline. The receiver includes means for receiving the communication signals transmitted over the powerline and means for reactively coupling the communication signals from the powerline to the receiver.

DISCLOSURE OF PREFERRED EMBODIMENT

Other objects, features and advantages will occur to those skilled in the art from the following description of a preferred embodiment and the accompanying drawings, in which.

Figures 1A, 1B:
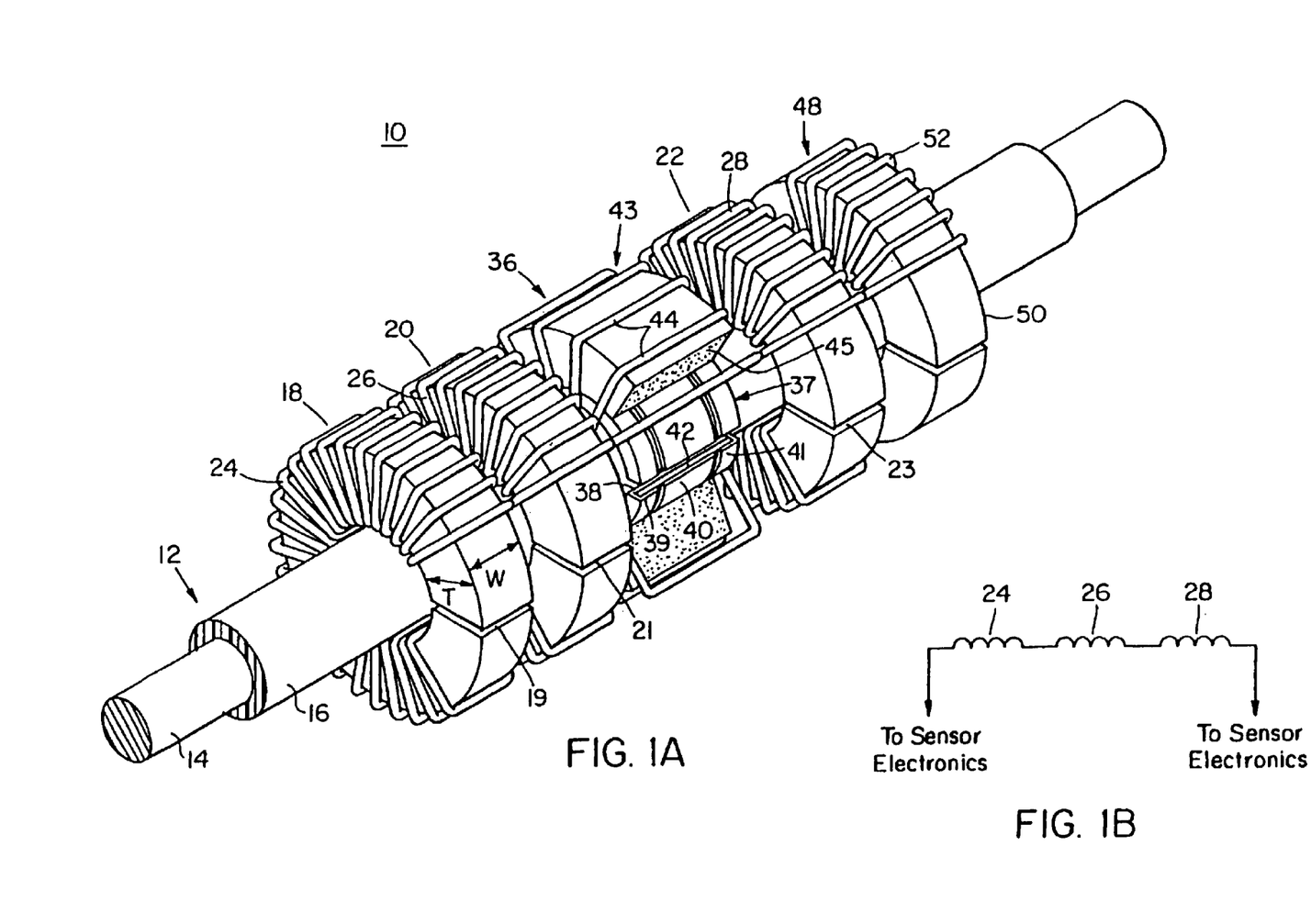
FIG. 1A is a three dimensional view of a modular core, self-powered powerline sensor according to this invention.
FIG. 1B is a schematic view depicting the interconnection of the windings about the modular core elements of FIG. 1.

There is shown in FIG. 1A modular core, self-powered powerline sensor 10 according to this invention disposed about a.c. powerline 12. Powerline 12 includes conductive strands (or a single core) 14 and an insulating rubber layer 16. The a.c. powerline 12 shown is a cable of the type typically used in underground secondary power distribution applications; however, this is not a necessary limitation of this invention, as sensor 10 may be utilized in overhead, secondary voltage applications and in overhead and underground primary voltage applications with insulated or uninsulated cable.

Power Extraction

Sensor 10 includes low profile, modular core elements 18, 20 and 22 which are disposed about powerline 12 by urging apart gaps 19, 21 and 23 therein to install the core elements on powerline 12 and then allowing them to resiliently return to their original position to secure the core elements in place. The core elements are formed of a highly magnetically permeable ferromagnetic material such as steel and are typically coated with insulating material.

Core elements 18, 20 and 22 are toroidal in shape and have cross-section thicknesses T which are approximately equal to their widths W, typically approximately ½ inch. Thus, as described in the Background of Invention, they are approximately configured for the most efficient power extraction from a.c. powerline 12. Also as described in the Background of Invention, with single core systems, in order to improve the amount of power extraction from the a.c. powerline the width of the core must be increased and its cross-section thickness must be commensurately increased to maintain efficiency. But, since the cross-section thickness is increased to maintain efficiency, the profile of the sensor becomes very large and prohibits its application in restrictive volumes and on closely spaced lines. According to this invention, the core is comprised of a number of modular core elements, in this case three (3). This maintains the efficiency of the sensor by making the cross-section thickness of the core elements approximately equal to their widths, and by using a number of core elements the cross-section thickness of the sensors can be limited to maintain a low profile while power extraction is increased.

The sizing of core elements 18, 20, and 22 for optimized power extraction is a combination of minimizing losses while maximizing coupling between the plurality of windings on the core (the secondary windings) and the powerline cable passing through the center of the core (the primary winding).

The three fundamental losses observed in practice are the losses due to the resistance of the secondary windings, losses due to magnetic leakage inductance, and the losses due to eddy currents induced in the core material. Other losses exist and can impact performance to a greater or lesser extent depending on design details. However, the three losses described above have been the major losses observed.

In tested embodiments of the sensor, the cores have included designs fabricated from tape wound magnetic steel material. By tape wound, it is meant that the cores are built up by winding a continuous strip of steel in a spiral manner, creating a toroidal shape, much like a roll of common tape. The advantage of this fabrication approach is that it is relatively easy and inexpensive, and it permits the use of magnetic steel which is preferentially oriented to have the highest magnetic permeability aligned along the length of the steel strip. When such an oriented steel strip is wound into a toroidal shape, the highest magnetic permeability is approximately located along the circular path of the body of the toroidal core. Thus, the highest magnetic permeability path is aligned with the path of magnetic flux generated by the flow of current along the primary conductor passing through the center of the toroidal core. If a tape wound core is fabricated from magnetic material which is coated with an electrically insulating coating then that material will result in a core structure which effectively limits the flow of eddy currents along paths directed radially outward from the center of the primary winding through the core. Such a structure, however, does not tend to limit the flow of eddy currents along paths in the core which are parallel to the primary winding, and the eddy currents induced in the core by the primary winding currents, will tend to be along these parallel paths. Neglecting other issues, if the toroidal core can be electrically separated into multiple side-by side cores to make breaks in the core eddy current paths parallel to the primary windings, then these eddy currents will be substantially reduced along with the losses (inefficiencies) associated with them.

The cross-section of the cores can be optimized to minimize losses and maximize coupling between primary and secondary windings. A typical core has an inside radius $R_1$ outer radius $R_2$ and width W. The core cross-section thickness, T, is the difference between $R_1$ and $R_2$ or:

$$T = R_2 - R_1 \quad (1)$$

Coupling between the primary and secondary windings can be characterized by flux linkage in the core. Secondary winding resistance and leakage inductance can be characterized by the length of each secondary wrap on the core or the length of the core cross-section perimeter (2T+2W). By maximizing flux linkage and minimizing the core cross-section perimeter, core sizing can be optimized. For the ranges of sizes anticipated for the sensor, the optimized core sizing calls for ratios of W to T (W/T) which approximately range form 1 to 3. As described, the tested embodiments of the sensor have utilized three cores 18, 20, and 22 each with W/T ratios of approximately one.

A winding layer including windings 24, 26 and 28 is formed by wrapping a wire, such as a twenty-eight (28) gauge magnet wire, about each core element 18, 20 and 22 in a number of turns and interconnecting the windings of each core element in series as shown in FIG. 1B. Alternatively, the windings may be connected in parallel. The a.c. power in powerline 12 induces a current in windings 24, 26 and 28 by non-contacting transformer action. A suitable ratio of windings is chosen such that a desired current will be induced in the windings when a.c. powerline 12 is energized. The number of turns in the windings determines the ratio between the current induced in the windings and the current in a.c. powerline 12 up to the point at which the core elements 18, 20 and 22 contain an induced flux density which is at or below their level of saturation. A typical number of windings for each core element is 75 for extracting sufficient power to operate sensor 10 with line currents as low as 20 amperes. By increasing the number of core elements or windings or both, sensor 10 can be made to extract more power and therefore operate with even lower a.c. line currents.

Sensing Voltage

Figure 1C:
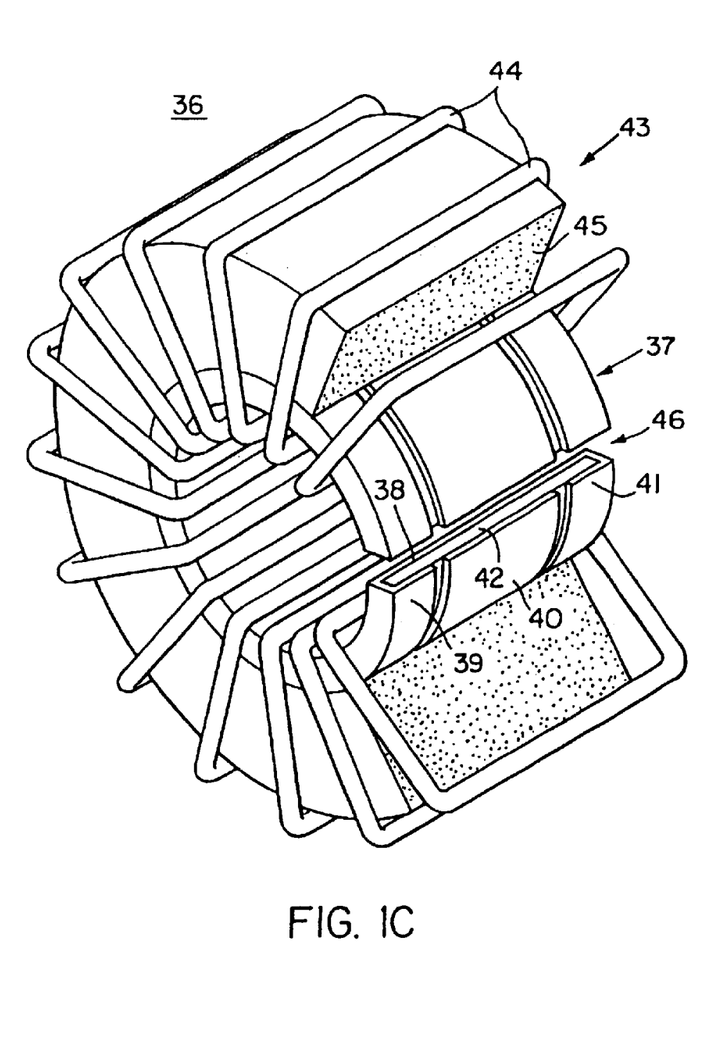
FIG. 1C is a three dimensional view of the sensing device of the modular core, self-powered powerline sensor as shown in FIG. 1A.

Sensor 10 further includes voltage and current sensing device 36, FIGS. 1A and 1C. Voltage is sensed by capacitor 37 having a first, inside surface conductor 38 closely spaced from insulating layer 16 of a.c. powerline 12 and outside surface conductor 40 spaced from inside conductor 38. Both conductors are coaxially disposed about a.c. powerline 12 and contained therebetween is a dielectric 42, such as air or a foam core. Capacitor 37 is used to sense voltage capacitively coupled from a.c. powerline 12 which is proportional to the powerline 12 voltage and, as described below, as a receiver for capacitively coupling high frequency powerline communications from powerline 12. Because capacitor 37 is coaxially disposed about a.c. powerline 12 it tends to cancel the effects of power in powerlines other than powerline 12 which may be closely spaced to powerline 12.

To further reduce noise and/or undesired effects from external fields, for example from adjacent powerlines or other sources of electromagnetic fields, inside surface conductor 38 is electrically connected to additional coaxial plates 39 and 41 which are spaced outside of plate 38 in the same manner as plate 40 and with the same dielectric between plates 39 and 38 and plates 38 and 41. Additional plates 39 and 41 each have approximately one half of the surface area of outer coaxial plate 40 and are electrically connected to inner coaxial plate 38 as shown. Therefore, any external signal will tend to be picked up equally by both inner coaxial plate 38 and outer coaxial plate 40 and not be present in a differential measurement between inside surface conductor 38 and outside surface conductor 40. There may be only one coaxial plate, e.g. plate 39 which has the same surface area as outer plate 40. Alternatively, there may be three coaxial plates, each with one third the surface area of outer plate 40. In general, if there are n plates, the surface area of each plate is $$\frac{1}{n}$$

of the surface area of outer plate 40.

Sensing Current

Disposed about capacitor 37 is an inductor 43 having a number of current measurement windings 44 wound about toroidal shaped separating material (e.g. foam) 45. Current from a.c. powerline 12 induces a current flow in windings 44 proportional to the current flowing in a.c. powerline 12. Because inductor 43 is wound about separating material 45 which contains air or foam material, it does not become saturated as does a typical iron core. Therefore the sensed current is more linear which makes it more accurate and easier to interpret.

Separating material 45 acts as a form for windings 44 and the material thereof has a low magnetic permeability like air. Separating material 45 can have a higher permeability but care must be taken to include gaps or to control the magnetic permeability so that the material of form 45 does not become magnetically saturated and the current sensed by inductor 43 becomes less than linear and more difficult to interpret. A non-linear current measurement could be sensed by inductor 43 and interpreted accurately, however, this would require somewhat greater complexity in other elements of the sensor.

Voltage and current sensing device 36 also includes a gap 46 formed therein for installing on and removing it from a.c. powerline 12. Although the voltage sensor device (capacitor 37) and the current sensor device (inductor 43) of voltage and sensing device 36 are shown disposed about powerline 12 at the same location, this is not a necessary limitation of present invention. They may be disposed adjacent to each other, or even spaced from each other.

Communications

Communications device 48 is comprised of communications core element 50 and a plurality of windings 52 wound about core element 50 for non-invasively transmitting communications from sensor 10 to a.c. powerline 12 by non-contacting transformer action. It is preferred, to use communications device 48 as a high frequency communication transmitter and to use the capacitor 37 of sensor 36 as a high frequency communications receiver, in addition to being used as a voltage sensor. Although either could be used to transmit or receive, or both. Thus, the non-invasive coupling of communicating signals to and from a powerline according to this invention can generally be described as reactive coupling to encompass both capacitive and inductive coupling techniques.

Figure 2:
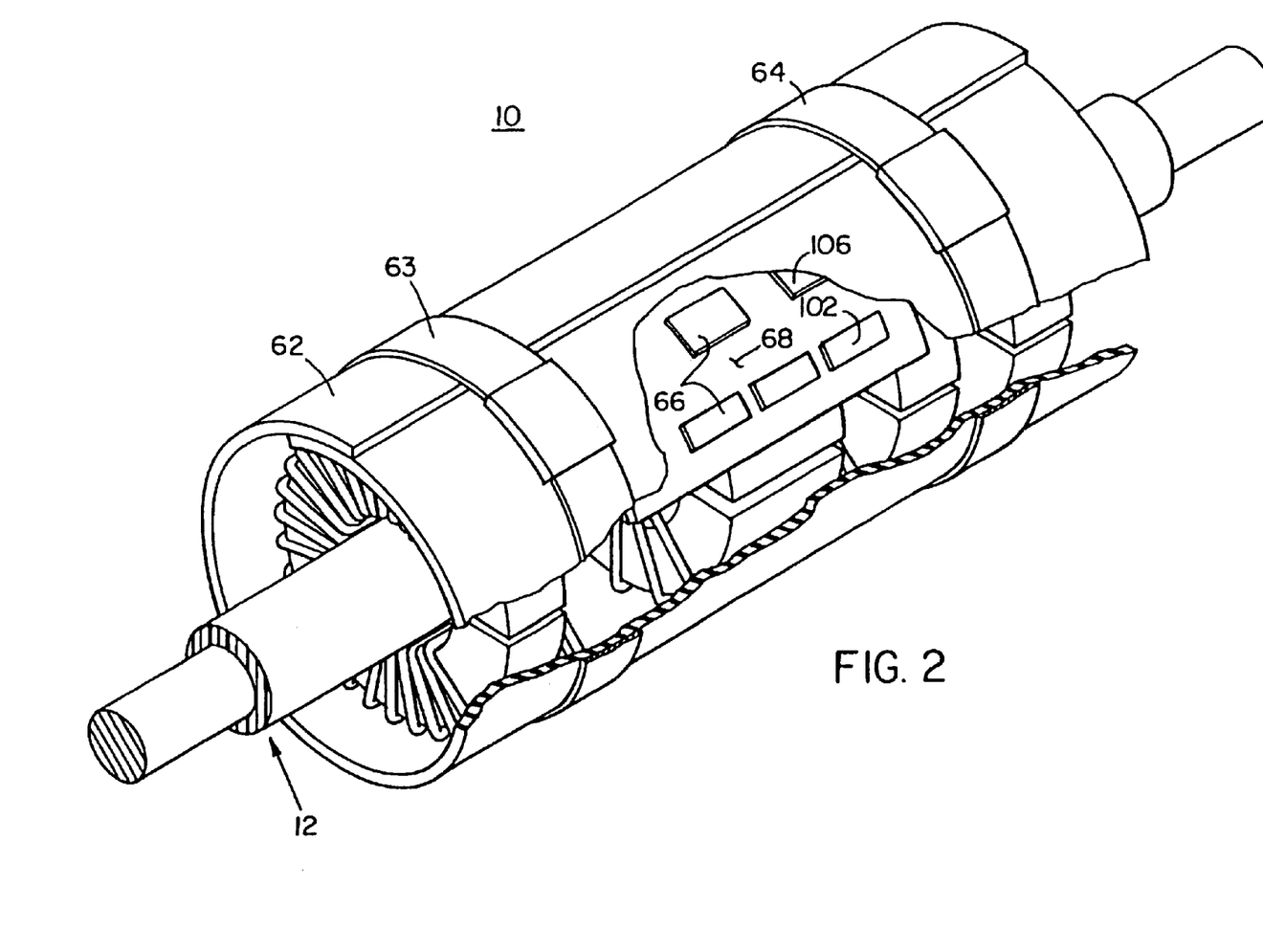
FIG. 2 depicts the modular core, self-powered powerline sensor of FIG. 1 with a protective covering wrapped thereabout and electronics components disposed between the protective covering and the windings of the sensor.

Sensor 10 typically includes a protective covering 62, FIG. 2, which provides electrical insulation. Covering 62 is normally formed of rubber and is affixed to the windings by means of self-vulcanizing tape, adhesive, or by some other suitable means. Retaining ties 63 and 64 removably secure powerline sensor 10 in place about a.c. powerline 12. Covering 62 performs the additional functions of effectively sandwiching a number of electronics components 66 mounted on flexible printed circuit board 68 between it and the surface of the windings. An electrical connection between the windings (FIG. 1B) and the electronics components is accomplished by electrical connections not visible in this figure but shown schematically in FIG. 3. Electronics components 66 include various types of sensors for sensing essentially any phenomenon, e.g. temperature, pressure, radiation, moisture etc., a power supply powered by windings 24, 26 and 28 (FIG. 1) energized by non-contacting transformer action with a.c. powerline 12, a microcontroller and various other components which are discussed in more detail below with regard to FIG. 3.

Although all of the electronics components depicted in FIG. 2 are shown secured to flexible circuit board 68, this is not required, as sensors could be disposed off circuit board 68 and sandwiched between protective covering 68 and the windings, or, sensors could even be placed on the exterior of protective coating 62 to sense certain types of phenomenon about the exterior of protective covering 62.

Figure 3:
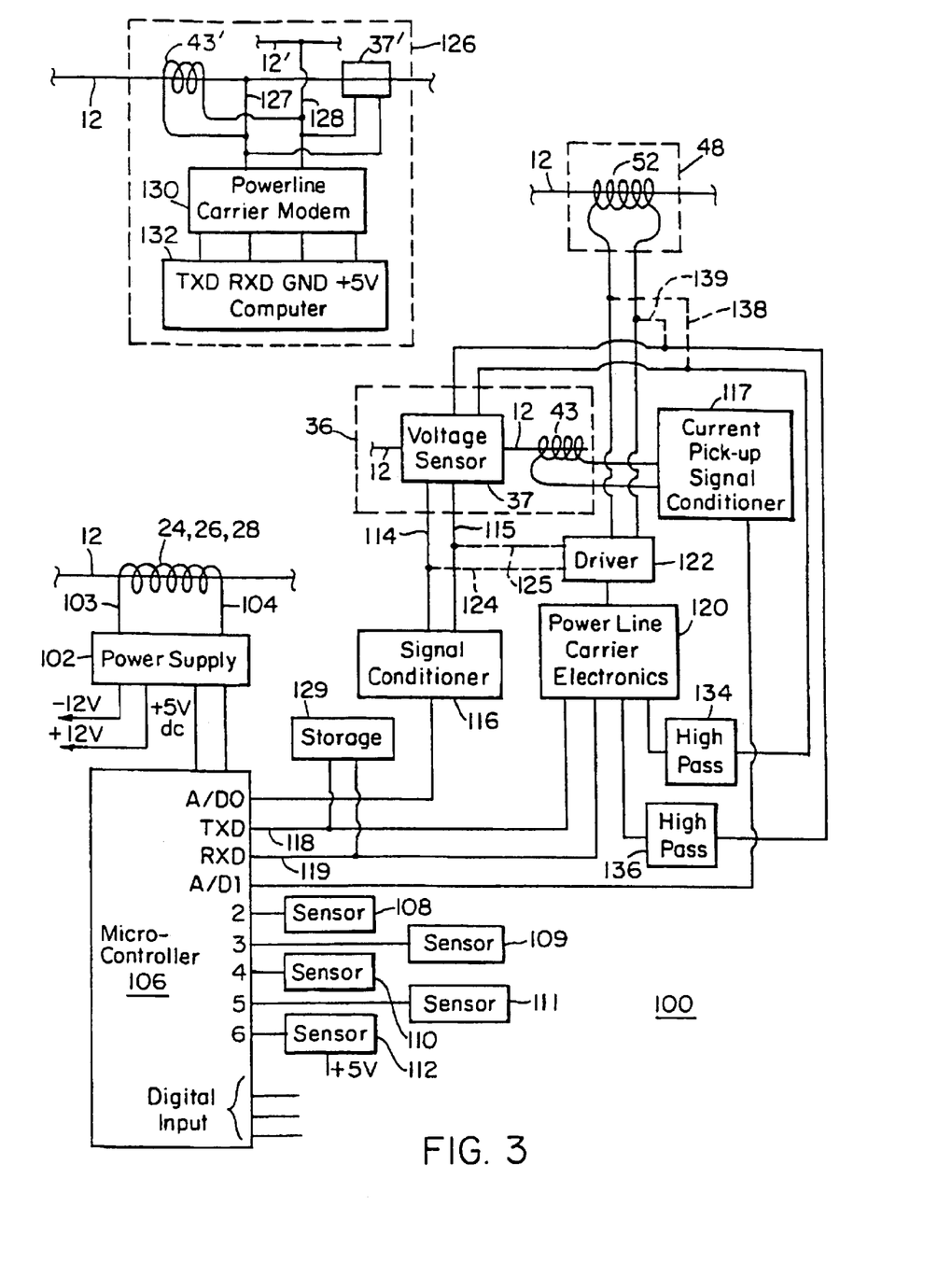
FIG. 3 is a schematic block diagram of the sensor of FIG. 1 and a base station both coupled to an a.c. powerline.

Modular core self-powered powerline sensor 10 is schematically depicted in system 100 of FIG. 3. Power for modular core, self-powered powerline sensor 10 is derived from a.c. powerline 12, which may be a single phase powerline which may be alone or part of a multiphase power transmission or distribution system, by means of windings 24, 26 and 28 which in this figure are depicted as a single winding for clarity. These windings are connected to power supply 102, which is disposed on flexible circuit board 68, by means of lines 103 and 104. Power supply 102, which may be an a.c. to d.c. regulator integrated circuit, provides 5V d.c. to microcontroller 106 and it also provides ±12V and +5V outputs which may be utilized by one or more of the sensors or other electronics components.

Microcontroller 106 may be an 8-bit embedded-controller with an analog to digital converter. Sensors 108–112 are shown interconnected to microcontroller 106, however, various numbers of sensors can be utilized. Sensors 108 through 110 are disposed on flexible circuit board 68 while sensors 111 and 112 are disposed on the exterior of protective covering 62, FIG. 2. Only one sensor, sensor 112, is powered by power supply 102, as the remaining sensors do not require external power to operate. These sensors provide an analog or digital signal to microcontroller 106 representative of the particular condition sensed in or about a.c. powerline 12. In addition to those sensors, there are also shown capacitor 37 which operates as a voltage sensor and inductor 43 which acts as a current sensor.

Capacitor 37 is interconnected by lines 114 and 115 to signal conditioner 116 which performs amplification and filtering of the sensed signal to match the input requirements of microcontroller 106. The signal from voltage sensor 37 is a capacitively coupled voltage which is indicative of the instantaneous voltage on a.c. powerline 12. Voltage sensor 37 does not provide an absolute voltage reading to microcontroller 106 since there is no reference voltage. An average or nominal voltage level, however, can be determined by monitoring the instantaneous voltage levels supplied by capacitor 37 over a period of time and a variation from the nominal voltage level can be resolved from the instantaneous input from capacitor 37 after the nominal level is established. Microcontroller 106 can perform other statistical manipulations of the non-referenced voltage input signal, such as weighting, and can determine deviations from these other types of statistical determinations.

Current sensing is performed by inductor 43 which has induced therein a current proportional to the a.c. line current in powerline 12. The induced current is then provided to current pickup signal conditioner 117 which amplifies and filters the signal before providing it to microcontroller 106.

Sensors 108–110 are located on flexible circuit board 68 and sensors 111 and 112 are located on the exterior or protective covering 62. These sensors can sense, for example, temperature, pressure, gas, moisture, radiation or light (visible or infrared). In fact, a sensor for sensing virtually any phenomenon could be utilized. Certain sensors, such as a temperature sensor or a radiation sensor may be installed directly on flexible circuit board 68: other sensors such as sensors 111 and 112 which may sense, for example, gas and light, would only operate if located on the exterior of protective covering 62.

Sensors 108–112 and voltage and current sensor 36 continuously sense various conditions in and about a.c. powerline 12 and provide microcontroller 106 with analog or digital signals representative of these sensed conditions. The signals provided by the sensors are converted to digital signals, if necessary, by microcontroller 106 which then generates communications data indicative of the sensed conditioned and that data is provided over line 118 to powerline carrier electronics 120 which encodes the data. Powerline carrier electronics 120 then provides the encoded data to output driver 122 which is used to transmit a low voltage, high current pulse to windings 52 of communications device 48 to non-invasively couple the transmission from microcontroller 106 of sensor 10 to a.c. powerline 12 through non-contacting transformer action. For localized readout of the condition of the powerline, storage device 129 may be connected to lines 118 and 119. Storage device 129 is located at some convenient location proximate the powerline.

Alternatively, as shown in phantom, the output from driver 122 may be provided over lines 124 and 125 to inside and outside surface conductor 38 and 40, respectively, of capacitor 37, FIG. 1. In that configuration the signals transmitted from microcontroller 106 are capacitively coupled to a.c. powerline 12 and driver 122 must be configured to provide a high voltage, low current output pulse. Presently it is preferred to configure driver 122 to drive windings 52 of communications device 48. Driver 122 may be a high voltage amplifier (inverting or non-inverting).

The data transmitted from microcontroller 106 contains an identification code which identifies powerline sensor 10 and an identification code for each particular individual sensor (108–112 and 37 and 43) on powerline sensor 10, indicating the type of data that is being transmitted. That is, the transmission includes information about the origin of the transmission (many powerline sensors can be utilized in various locations on an electric utility company's distribution system) and information about the type of data being transmitted; i.e. whether it be data regarding voltage, current, temperature, radiation, etc. The transmission and identification code and data of interest can occur on a regular basis, on a time basis, when particular threshold values are sensed, or according to any desired criterion. The communications code may follow a selected formal communications system specification or protocol. The protocol may be based on the OSI (Open Systems Interconnect) reference model for communications developed by the ISO (International Organization for Standardization) Geneva, Switzerland. Any other communications code that would be suitable for powerline communications could also be utilized.

The data transmitted from sensor 10 is received by remote base station 126. Base station 126 is interconnected to powerline 12 by means of direct electrical connections 127 and 128 connected to powerline 12' which is a part of the powerline distribution or transmission system and is typically either ground, neutral, or a powerline of a different phase than powerline 12' (in a multiphase system). The connection to the powerline, however, could be accomplished by means of non-contacting transformer action or capacitive coupling as described above with regard to sensor 10. For example, inductor 43' could be used to provide a connection to the powerline by non-invasive inductive coupling and/or capacitor 37' could be used to provide non-invasive capacitive coupling. The transmitted data is provided to computer 132 through a standard powerline carrier modem 130 that matches the communications module of sensor 10. Base station 126 is also capable of transmitting data from computer 132 through powerline carrier modem 130 to a.c. powerline 12. Then, for example, base station 126 could poll modular core, self-powered powerline sensor 10 and any another powerline sensors on the system for sensor information on demand instead of passively awaiting transmissions from the powerline sensors. Moreover, the powerline sensors could be reprogrammed from base station 126.

Encoded communications transmitted from remote base station 126 are preferably received by capacitor 37 by means of the capacitive coupling from a.c. powerline 12. These high frequency communications signals are provided to high pass filters 134 and 136, are allowed to pass therethrough and are provided to powerline carrier electronics 120. Powerline carrier electronics 120 decodes the communications signals and then forwards them to microcontroller 106 on line 119.

Alternatively, windings 52 of communications device 48 could be used to receive the communications from remote base station 126. This is accomplished by providing lead lines 138 and 139 (depicted in phantom) which interconnect windings 52 to high pass filters 134 and 136.

It should be noted that although it is preferred to use non-invasive powerline communications between sensor 10 and base station 126, this is not a necessary limitation of this invention. Direct contact powerline communication or non-powerline communications, such as RF, phone line modem, cable TV, cellular phone, infrared, fiber optic cable, microwave, or ultra-sonic communications could be utilized.

Microcontroller 106 performs analog-to-digital conversion of sensed conditions, manipulates and updates the memory locations which store previous sensed conditions, performs numerical operations such as determining a moving time average, etc., keeps track of the time for synchronization purposes, and controls the communications between modular core self-powered powerline sensor 10 and base station 126.

Microcontroller 106 can provide base station 126 with actual instantaneous values of particular sensed conditions, i.e. actual temperature or radiation readings. However, it can also provide base station 126 with an indication that a particular condition being sensed has varied from a nominal level and the amount of such variance. As discussed briefly above, this type of data transmission is required with voltage sensing because there is no reference level to which the sensed voltage can be compared to determine an absolute voltage. Therefore, the voltage sensed is compared with a nominal level and the variance of the sensed voltage from the nominal level is determined and transmitted to base station 126. The nominal level may be an average voltage level, or, other types of statistical manipulation may be performed on the sensed voltage data, such as weighting, and be compared to a nominal level to determine variances from the nominal level. Moreover, although this process is not required to be performed with all types of sensors (since many sensors provide an absolute value of the condition being sensed), it may be used with any condition sensed. In fact, it may be more useful to provide the variance from the nominal level of the condition sensed rather than providing the actual absolute value sensed. This is so because in many instances the conditions that are being monitored are not monitored for the actual value, but rather they are being monitored for a variance from some nominal value.

Figure 4:
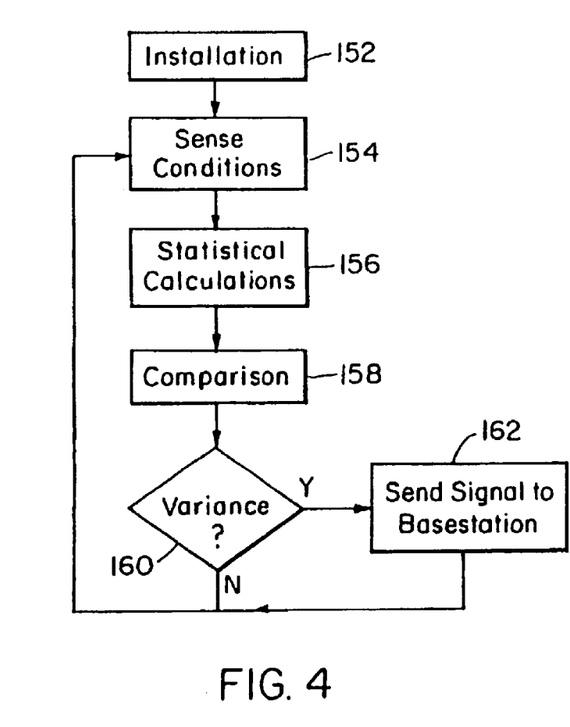
FIG. 4 is a flow chart of the software that may be used by the microcontroller of FIG. 3 in order to construct a time based nominal level for a sensed condition in or about the a.c. powerline to determine variances from the nominal condition in or about the a.c. powerline.

In order to detect and transmit variances from a nominal level of a sensed condition, microcontroller 106 operates according to flow chart 150, FIG. 4. At step 152 the modular core, self-powered powerline sensor is installed and a condition or conditions (e.g. voltage, current, temperature, radiation, etc.) are continuously, instantaneously obtained at step 154. At step 156 a time based average of the instantaneous values or any other type of statistical manipulation, such as weighting, of the sensed condition over time period t is conducted to determine a nominal level for that condition on the a.c. powerline. At this point the initial calibration is complete, in that the nominal level for the desired type of statistical manipulation has been determined. The calibration process can take anywhere from several seconds, to weeks or even months to obtain an accurate nominal level reading. After the initial calibration process is complete, at step 158 the instantaneous value obtained at step 154 is compared to the nominal level. After the initial nominal level is determined, it is continually recalculated from new instantaneous sensor data. At step 160 it is determined if the instantaneous value varies from the nominal level, and if it does a signal indicating that there is a variance and the extent of that variance is transmitted to the remote base station at step 162. Whether or not a variance was detected, the system returns to step 154 where another instantaneous value is obtained and the process continues until the sensor is removed from the a.c. powerline or a determination of the particular condition being sensed is no longer required.

Thus, capacitor 37, FIGS. 1 and 3 performs the following functions. First, capacitor 37 is used to sense voltage on the powerline. Second, capacitor 37 is used to reactively couple communication signals to the powerline. Third, capacitor 37 is used to reactively communicate signals sent from base station 126 to microcontroller 106. Finally, capacitor 37', located proximate the base station 126, is used to reactively receive communication signals from sensor 10 and to transmit communication signals from base station 126 back to sensor 10.

Inductor 43 operates in a similar fashion. It not only senses current on the powerline; it is capable of reactively coupling communication signals to the powerline for transmission to base station 126. Inductor 43' is also used to reactively receive communication signals from sensor 10 and to transmit signals from base station 126 to sensor 10.

Although the powerline communications described with regard to the preferred embodiment relate to conditions sensed in or about the a.c. powerline by sensor 10, this invention is not limited to non-invasive sensor data transmission and reception. Of course, the non-invasive powerline communications system of this invention could be used for any type of powerline communication.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A non-invasive powerline communication system, comprising:
    means for generating communication signals at a first location for transmission on a powerline;
    means for reactively coupling the communication signals to the powerline without tapping the powerline; and
    means for receiving said communication signals at a second location.

2. The non-invasive powerline communications system of claim 1 in which said means for generating includes a first communications device.

3. The non-invasive powerline communications system of claim 1 in which said means for reactively coupling includes means for inductively coupling said communication signals to the powerline.

4. The non-invasive powerline communications system of claim 3 in which said means for inductively coupling includes a communications core element disposed about the powerline and a plurality of windings disposed bout said communications core element for coupling said communication signals to the powerline.

5. The communications system of claim 1 in which said means for reactively coupling includes an inductor.

6. The non-invasive powerline communications system of claim 1 in which said means for receiving includes means for reactively coupling said communication signals on the powerline at said second location.

7. The non-invasive powerline communications system of claim 6 in which said means for reactively coupling includes means for inductively coupling said signals to and from the powerline.

8. The non-invasive powerline communications system of claim 7 in which said means for inductively coupling includes a communications core element disposed about the powerline and a plurality of windings disposed bout said communications core element for coupling said communication signals to and from the powerline.

9. The non-invasive powerline communications system of claim 1 further including means for extracting from the powerline said communication signals transmitted from said second location.

10. The non-invasive powerline communications system of claim 9 in which said means for extracting includes means for reactively coupling from the powerline said communication signals transmitted from said second location.

11. The non-invasive powerline communications system of claim 10 in which said means for reactively coupling from the powerline said communication signals transmitted from said second location includes means for inductively coupling from the powerline said signals transmitted from said second location.

12. The non-invasive powerline communications system of claim 11 in which said means for inductively coupling includes a communications core element disposed about the powerline and a plurality of windings disposed bout said communications core element.

13. The non-invasive powerline communications system of claim 1 further including means for encoding said communication signals.

14. The non-invasive powerline communications system of claim 4 in which said means for inductively coupling further includes driver means for providing low voltage, high current pulses of said communication signals to said plurality of windings to inductively couple said pulses to the powerline.

15. The non-invasive powerline communications system of claim 1 further including a storage device proximate said first location.

16. The non-invasive powerline communications system of claim 15 further including means for transmitting said communications signals to said storage device.

17. A non-invasive powerline communications transmitter, comprising:
    means for generating communication signals for transmission on a powerline; and
    means for reactively coupling said communication signals to the powerline without tapping the powerline.

18. A non-invasive powerline communications receiver for receiving communication signals transmitted over a powerline, comprising:
    means for receiving the communication signals transmitted over the powerline; and
    means for reactively coupling the communication signals from the powerline to said means for receiving without tapping the powerline.

19. A non-invasive powerline communications system comprising:
    a sensor for sensing a condition of a powerline;
    a base station remote from the sensor;
    means for reactively coupling a signal from the sensor onto the powerline for transmission to the remote base station without tapping the powerline;
    means for reactively coupling said signal transmitted on the powerline from the powerline to the remote base station without tapping the powerline;
    means for reactively coupling a signal generated by the base station onto the powerline without tapping the powerline; and
    means for reactively coupling the signal on the powerline from the base station to the sensor without tapping the powerline.

20. A modular core, self-powered powerline communications system, comprising:
    a plurality of modular core elements for disposing about an a.c. powerline;
    a winding layer to be energized by the a.c. powerline, including a plurality of windings disposed about each said modular core element, wherein the windings of each said modular core element are interconnected;
    means for sensing a condition in or about the a.c. powerline;
    controller means, powered by said windings and responsive to said means for sensing, for receiving a signal indicative of the condition sensed; and
    means for reactively coupling the said signal to the powerline without tapping the powerline.

21. The modular core, self-powered powerline sensor of claim 20 in which said modular core elements are formed of highly permeable ferromagnetic material.

22. The modular core, self-powered powerline sensor of claim 21 wherein the windings of each said modular core element are interconnected electrically in series or in parallel.

23. The modular core, self-powered powerline sensor of claim 21 in which said plurality of windings are energized by non-contacting transformer action with the a.c. powerline.

24. The modular core, self-powered powerline sensor of claim 21 in which said means for sensing a condition includes means for sensing the voltage on the a.c. powerline.

25. The modular core, self-powered powerline sensor of claim 21 in which said means for sensing includes means for sensing the current of the a.c. powerline.

26. The sensor of claim 20 in which said means for sensing includes an inductor.

27. The sensor of claim 26 in which said inductor includes a plurality of current measurement windings wound about a separating material disposed about the powerline.

28. The sensor of claim 27 in which said separating material has a low magnetic permeability.

29. The sensor of claim 28 in which said separating material is foam.

30. The modular core, self-powered powerline sensor of claim 20 in which said means for relatively coupling includes a communications core element dispose about the a.c. powerline and a plurality of windings disposed about said communications core element for coupling said signal to the a.c. powerline through non-contacting transformer action.

* * * * *